United States Patent [19]
Cragon et al.

[11] 3,787,855
[45] Jan. 22, 1974

[54] COHERENT DIGITAL RADAR TARGET SIGNAL ENHANCEMENT

[75] Inventors: Harvey G. Cragon, Dallas; Russell H. Logan, Irving, both of Tex.

[73] Assignee: Texas Instruments Incorporated, Dallas, Tex.

[22] Filed: Dec. 30, 1966

[21] Appl. No.: 606,081

[52] U.S. Cl. ..... 343/17.1 R, 343/5 DP, 343/100 CL
[51] Int. Cl. .............................................. G01s 7/28
[58] Field of Search ........ 343/16 R, 17.1 R, 100 CL, 343/5 DP

[56] References Cited
UNITED STATES PATENTS

| | | | |
|---|---|---|---|
| 3,727,215 | 4/1973 | Wilmot | 343/5 DP |
| 3,731,304 | 5/1973 | Caspers et al. | 343/5 DP |

Primary Examiner—T. H. Tubbesing

[57] ABSTRACT

Return signals from successive radar pulses are continuously cross-correlated with a dynamic mask, variations in which are dependent upon velocity and the angle between radar bore site and the main radar beam and wherein a mask is selectively weighted.

11 Claims, 5 Drawing Figures

3,787,855

COHERENT DIGITAL RADAR TARGET SIGNAL ENHANCEMENT

FIELD OF THE INVENTION

This invention relates to pulse doppler radar with means for cross-correlation between radar returns and a mask of selected character for doppler beam sharpening of ground targets and accurate determination of the center of the clutter doppler spectrum.

THE PRIOR ART

Doppler radar heretofore has been understood and used. A fairly comprehensive description is found in *Introduction to Radar Systems* by Merrill I. Skolnik, McGraw-Hill, 1962, Chapter 4, p. 113 et seq. Problems peculiar to airborne radar and background clutter are discussed beginning at page 140, wherein it is indicated that various expedients have heretofore been employed in order to detect target echo energy from the clutter doppler spectrum. Limitations in such systems involve equipment complexity.

A modulated carrier radar illustrating one approach to a solution to problems present in target indentification is found in U.S. Pat. No. 2,834,956 to Harris.

SUMMARY OF THE INVENTION

In accordance with the present invention, means are provided for doppler beam sharpening of ground targets wherein radar returns from successive pulses are digitized and passed serially through a series of shift registers. The signals are clocked through the shift registers synchronously to present the same time sample of all returns within a beam width at the last stage of the shift registers simultaneously. Since the waveform of the returns for successive pulses can be predetermined, the output samples from the shift registers are applied to summation means, the output of which is applied to a display so that the pulse doppler RF spectrum is effectively modified by cross-correlation between the returns and a mask dependent upon anticipated returns.

THE DRAWINGS

PREFERRED EMBODIMENTS

Advances in digital components and applications permit practical implemention of radar data processing using digital techniques. The problems to which this invention is directed involve repetitive examination of data while searching for a signal whose power level can be far below the ambient background or clutter.

Useful radar operation requires the selection of desired target signal characteristics with accompanying discrimination against unwanted signals. This deceptively simple statement poses rather formidable problems to the airborne radar. Ground-based radar signal processing is more readily realizable because it is stationary and the restrictions on size, weight, and general complexity are not as critical as in the airborne case. The usual system considerations such as maximum transmitted power, minimum receiver noise figure, coherent techniques, and optimum antenna pattern are approched with the best engineering concepts consistent with the space and weight restrictions imposed by the aircraft.

Forward motion of the aircraft presents a dilemma. The motion imparts a doppler shift to illuminated targets. For synthetic aperture or beam-sharpened ground mapping, reliance is placed on the predictable doppler shift of fixed targets to achieve an effective azimuthal resolution much better than the normal antenna beamwidth. For high resolution reconnaissance and mapping radar application, velocity-imparted doppler shift is an indispensible asset.

Figure 1:
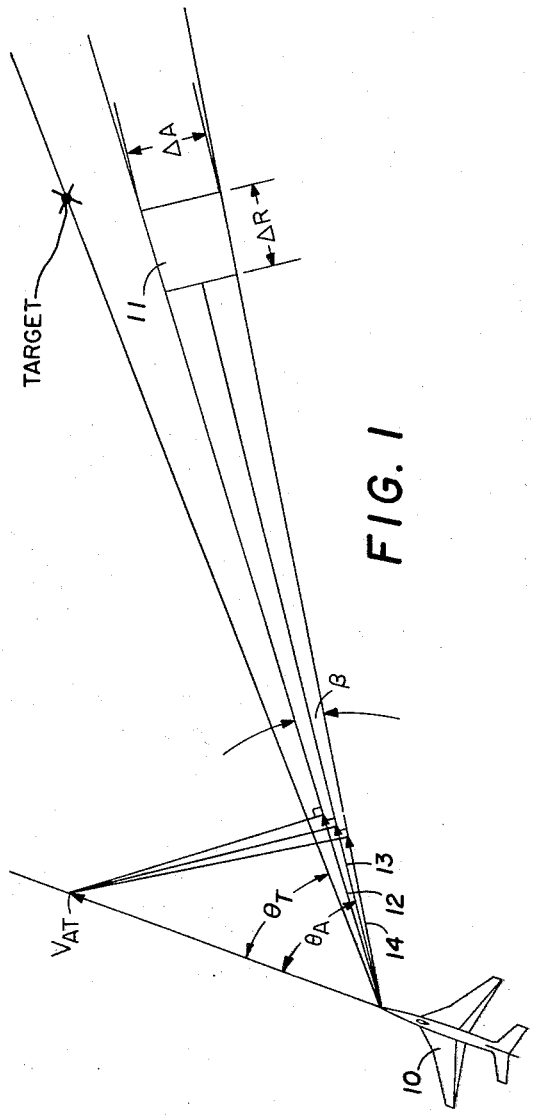
FIG. 1 illustrates operation of an airborne radar.

Representative of the airborne radar problems is the operation shown in FIG. 1 where an aircraft 10 is shown moving at a velocity $V_{AT}$. The center of the radar beam is positioned at an angle $\theta_A$ relative to bore site. The radar beam has a beamwidth $\beta$ and, for the purpose of the present description, will be considered to have a range gate $\Delta R$ which is determined by the effective transmitted pulse length and an azimuth resolution $\Delta A$ determined by the effective beamwidth.

As a target moves through the beam in the range gate 11, the relative velocity between the aircraft 10 and the target will be different for successive transmitted radar pulses. More particularly, as the target enters the beam, the vector 12 represents the effective velocity of the aircraft 10 relative to the target. As the target is in the center of the beam, the vector 13 which is shorter than vector 12 represents a lower effective velocity. As the target is in the trailing portion of the beam, the vector 14, still shorter, represents the effective velocity. Thus, the target, as it occupies different angles relative to bore site, produces a doppler shift in the return signal. The relationships for the doppler shift frequency are well known and may be expressed as follows:

$$f_{(t)} = 2V_{AT}/\theta \; \text{COS} \; \theta_T(t) \; \text{COS} \; ([\theta_A - \theta_T^{(t)}]\pi/\beta) \quad (1)$$

where:

$f_{(t)}$ is the output of a phase detector in which the return signal is phase detected against the output of a stable local oscillator as is conventional in doppler radar;

$V_{AT}$ is the forward velocity of the aircraft 10 as shown in FIG. 1;

$\theta_A$ is the beam angle as shown in FIG. 1;

$\theta_T$ is the true target angle with respect to the aircraft velocity vector, as shown in FIG. 1; and $\beta$ is the beamwidth.

The antenna has a target gain pattern which weights the doppler signal amplitude in accordance with the following expression:

$$G \approx \text{COS} \; [(\pi/\beta) \; (\theta_A - \theta_T) \; ] \quad (2)$$

for $(\theta_A - (\beta/2)) \leq \theta_T^{(t)} \leq (\theta_A + (\beta/2))$ and approximately zero elsewhere. (3)

Figure 2:
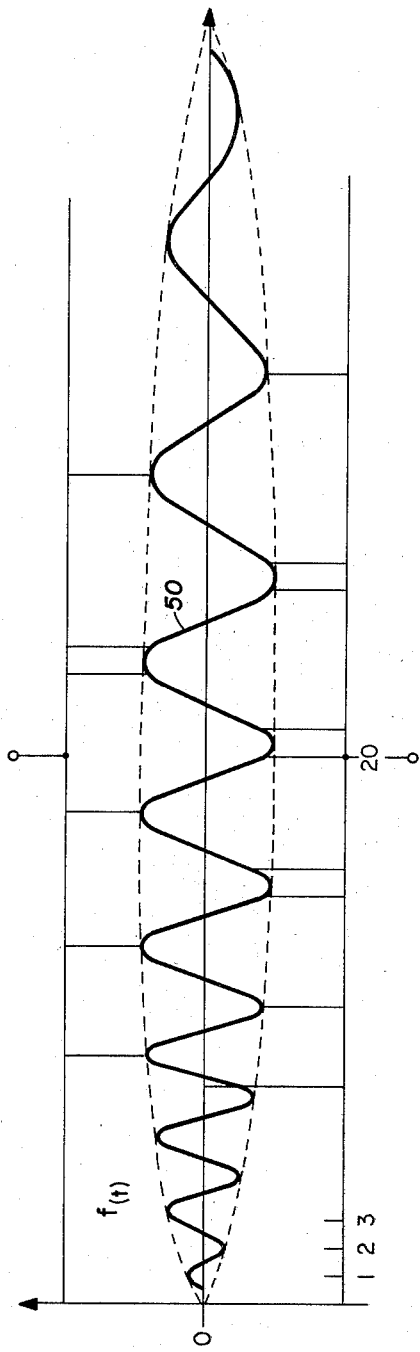
FIG. 2 illustrates the doppler return signal.

FIG. 2 illustrates an FM doppler signal 50 that might exist within a given range interval. The length or duration of the signal is proportional to the normal antenna beamwidth and it is sampled at the *prf* interval. Since the antenna angle and aircraft velocity are known, the nature of this FM doppler signal is readily determinable. Because the nature of the signal is determinable, there may be specified exactly which *prf* sample points are expected to be positive and which are expected to be negative, when the signal is exactly aligned with the total sample space. Where this is done, simple summation (integration) of all the sample points is most useful. For example, at the 18 *prf* sample point, a positive amplitude is expected. If a positive value is present, its value is used directly in parallel addition with the others. However, if a negative amplitude is present, its value will reduce the total sum, indicating decorrelation or lack of signal alignment. The total summation then is the cross-correlation integration across the entire beamwidth.

Characteristically the signal is of high frequency and of low amplitude when the target enters the beam. The frequency then continuously decreases as the target passes through the beam while the amplitude of the doppler return signal increases from a low level as the target enters the beam to a maximum level with the target is at the center of the beam and then decreases to a low level and then to zero as the target reaches the trailing edge of the beam and passes from the beam.

For the purpose of the present description, it will be assumed that the beam angle $\theta_A$ and the velocity $V_{AT}$ remain constant and that a target is to be identified in the presence of clutter as it passes through the beam.

As above noted, the doppler returns following a plurality of transmitted pulses are stored and sampled for cross-correlation. The doppler signal 50 of FIG. 2 represents 44 successive transmitted pulses. The characteristic decreases frequency accompanied by an increase and a decrease in amplitude is readily apparent.

With the expected waveform predetermined or known for any velocity and beam angle, the sample points for successive returns are selected based on expected polarity and expected amplitude and preferably are weighted and summed to provide an output signal. More particularly, the positive voltages in the waveform of FIG. 2 as they appear for *prf* sampling points 9, 13, 18, 23, 24, and 30 in waveform 50 are applied to an adder with full weight. Similarly, the negative voltages at *prf* sampling points 11, 15, 16, 20, 21, 26, 27, and 34 in waveform 50 are applied to an adder with full weight. The remaining (non-zero) voltages in the waveform 50 are applied to adders but weighted to have less effect than the pulses at or near the peaks of the waveform 50.

Figure 3:
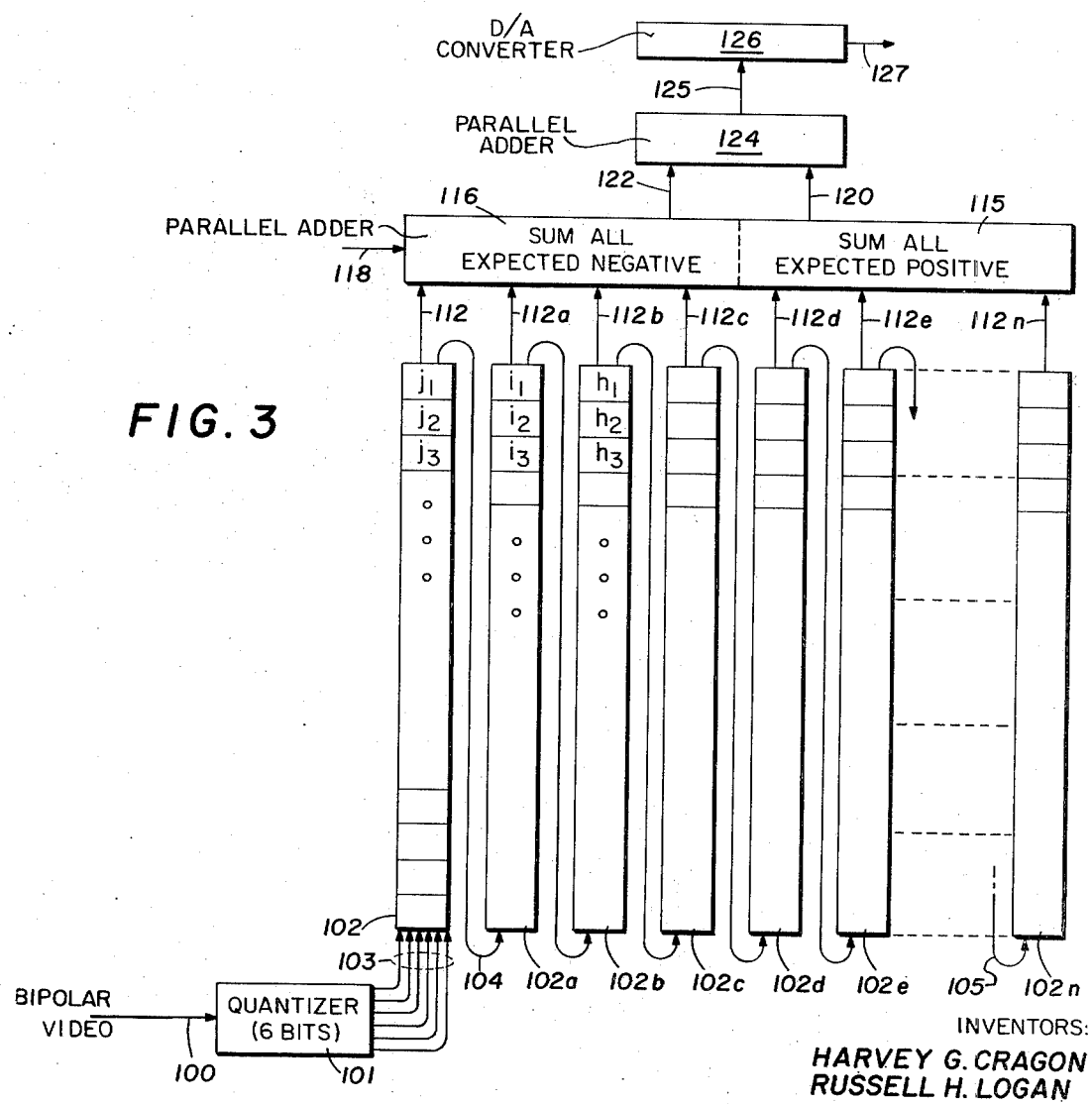
FIG. 3 illustrates a plurality of fixed registers in a cross-correlation system.

Referring to FIG. 3, coherent bipolar video signals as generally produced in prior art doppler radar systems are applied by way of a channel 100 to a quantizer 101 which generates a 6-bit digital representation of the video amplitude and a 1-bit representation of the sign. The quantizer is operated at a high data rate, for example, from 2 to 10 mHz. The use of 6 bits for the amplitude of each quantized sample of the bipolar video signals give a range of $2^6$ or 64 discrete levels, or a dynamic range of 36 db.

A quantized or digitized video signal from unit 101 is then fed to the first storage register 102 of a set of series connected storage registers including registers 102a–102n. Each storage register serves as a delay line with the delay inherently equal to one pulse repetition frequency (*prf*) interval. That is, a delay equal to the interval between successive pulses transmitted by the radar from plane 10, FIG. 1. Each storage register line consists of a plurality of storage locations equal to the number of range bins. Each range bin register is a 6-bit parallel shift register to store amplitude information and a 1-bit shift register to store the sign information. The quantizer 101 is connected to the first register line 102 by way of channel 103 with 7-bit data words being fed into the first range bin of the first register line 102 and with each such data word being stepped sequentially through the register line 102 and then by way of line 104 to register line 102a, and so on, down to and until the data words are transferred by way of line 105 into the last register line 102n.

The output bin or the last bin in each of the registers 102–102n are connected by way of channels 112–112n, respectively, to parallel adders 115 and 116. The adders 115 and 116 include a mask effectively superimposed thereon by way of channel 118 so that in adder 115 there is produced a summation signal on channel 120 which is representative of the sum of all expected positive values of the return signals stored in the register lines 102–102n. Adder 116 provides a summation output on channel 112 representative of the sum of all expected negative values. The signals on channels 120 and 122 are then applied to a parallel adder 124 whose output appearing on channel 125 is applied to a digital-to-analog converter 126. Converter 126 has an output channel 127 leading to a serial high resolution video presentation system synchronized with the radar pulse transmissions and the direction of the main lobe 12 of FIG. 1.

Stated in a more general sense, on the $i^{th}$ *prf* interval, the first register line 102 will be filled with the quantized bipolar coherent video for the interval. On the $j^{th}$ *prf* interval, the data stored in the first register line is processed to the second register line 102a while the radar data from the $j^{th}$ *prf* interval is being stored in the first register line 102. To permit processing a complete normal beamwidth of azimuth data, one register line is required for each radar *prf* interval within a beamwidth.

Preferably, a maximum of one beamwidth of data is stored at any one time, and this is continually updated. When a new set of returns are stored in the first register line 102, the oldest return is displaced from the last register line 102n. At any instant during the active data portion of the *prf* interval, all corresponding range bins, i.e., the $n^{th}$ range bin for each *prf* interval, appear at the top of each register line. All the data within the normal antenna beamwidth for any particular range bin is available simultaneously.

By performing the high-speed parallel summation (integration) across the beamwidth of all expected positive and expected negative sample positions, cross-correlation is effectively achieved based upon pattern recognition. The reference function corresponds with a ditital matched filter in the spatial domain.

After parallel summation, the digital cross-correlation product is converted back to analog video on channel 127. It should be noted that not only is the video presented in a serial radar sweep fashion, but also new data is available at the *prf* rate. Data is cross-correlated on a *prf* contiguous basis without any skips. This is a most efficient method for beam sharpening from the aspect of performance.

An objective of a beamwidth improvement factor of only 10:1, where the total beamwidth has 80 or more samples, will not require storage of a full beamwidth of data. This is borne out by theory and by results where the readout is less than 10 percent of the beamwidth. Because a great number fo flip-flop storage elements are required for each *prf* register line, the minimum storage that will still provide adequate resolution and signal-to-noise performance, consistent with maximum processor gain and minimum sidelobes will be used.

Figure 4:
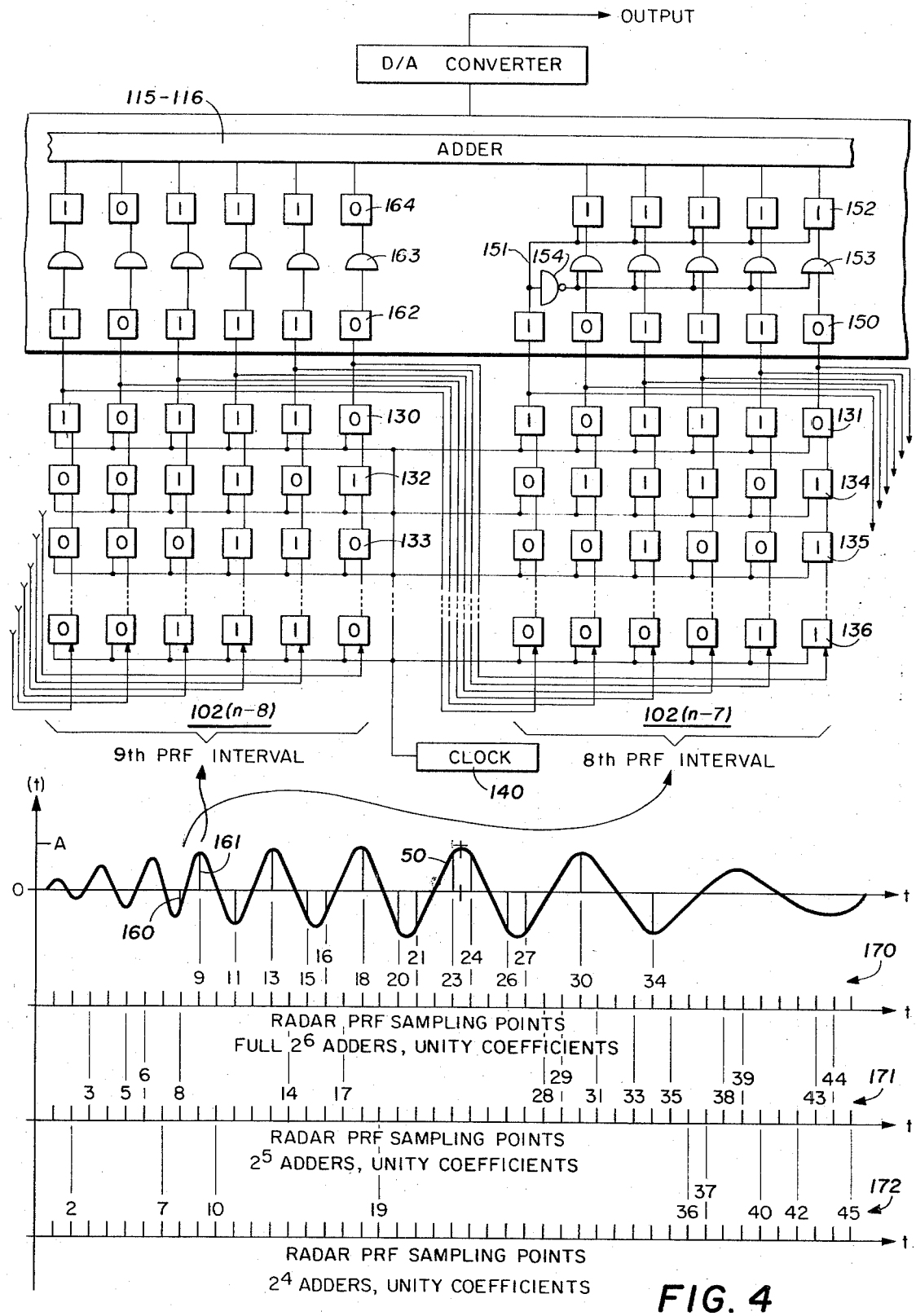
FIG. 4 illustrates operation of the system of FIG. 3.

In FIG. 4, representative weighting circuits haVe been illustrated wherein portions of shift registers 102($n$-8) and 102($n$-7) are illustrated. For simplicity only the 6-bits of amplitude are shown to illustrate the selective weighting scheme. The registers thus contain digital representations of the doppler return signal following the eighth and the ninth radar pulses, respectively. Thus, at a given range bin, the stage 131 of register 102($n$-7) will include a representation of the negative value of the waveform 50 following the eighth transmitted pulse. The same range bin 130 of register 102($n$-8) will include a digital representation of the amplitude of the doppler return signal following the ninth transmitted pulse. Range bins 132 and 133 in register 102($n$-8) represent the radar return signal for ranges greater than the range represented by the contents of bin 130. Similarly, bins 134 and 135 represent ranges greater than the range represented by bin 131.

It will be noted that a clock 140 applies shift pulses to each of the elements in all of the bins of registers 102($n$-8) and 102($n$-7). Further, the data in bin 130 is connected into the first bin 136 in register 102($n$-7).

The outputs of the registers 102($n$-8) and 102($n$-7) are selectively weighted and applied to adder 115–116. More particularly, the output of the bin 131 in register 102($n$-7) is clocked into a buffer register 150. The most significant bit in buffer 150 is applied by way of channel 151 to one input of each of the 5 bits in a register stage 152. The outputs of the 5 low order bits in the register stage 150 are applied by way of AND gates 153 to the register 152. The most significant bit is applied by way of NAND gate 154 to all of the AND gates 153. Thus, on the eighth *prf* sample point, it is expected that the amplitude 160 of the doppler return signal will be less than a maximum value. Therefore, if the output of the quantizer 101 (FIG. 3) provides a 1 in the most significant bit, then the presence of that condition in the most significant bit in register stage 150 will set all of the bits in register 152 to the 1 state. However, if there is a 0 in the most significant bit in register 150, then, by operation of the NAND gate 154 and AND gates 153, the contents of the 5 least significant bits in register state 150 will be transferred into register stage 152. The output of register 152 is then applied to adder 115–116.

In contrast, the magnitude 161 of the doppler return signal following the ninth *prf* sample point is expected to be at a maximum value. Thus, the output of the register 102($n$-8) is clocked directly into a buffer register stage 162, the output of which is applied by way of a transfer gate 163 to output register stage 164. The data thus stored in 164 is applied to adder 115–116 without weighting.

As illustrated by the sequence of *prf* sample points 170, samples will be applied to adders 115 and 116 at full value and without weighting at sample points 9, 11, 13, 15, 16, 18, 20, 21, 23, 24, 26, 27, 30, and 34. As indicated by series 171, if there is a 1 in the most significant bit for sample points 3, 5, 6, 8, 14, 17, 28, 29, 31, 33, 35, 38, 39, 43, and 44, then by means of NAND gate 154, all of the bits of output register stages, such as register stage 152, will be set to 1. If there is a 0 in the most significant bit, then the actual values will be clocked into output register stages, such as the register stage 152.

As indicated by the series 172, if there is a 1 in either the most significant bit or the next most significant bit at sample points 2, 7, 10, 19, 36, 37, 40, 42, and 45, then the 4 least significant bits of the output register stage, such as stage 152, will be set to 1 for application to adder 115–116. In contrast, if there is a 0 both in the most significant bit and in the next most significant bit at such sample points, then the actual values of the 4 least significant bits will be clocked into the final register stage for application to adder 115–116.

Figure 5:
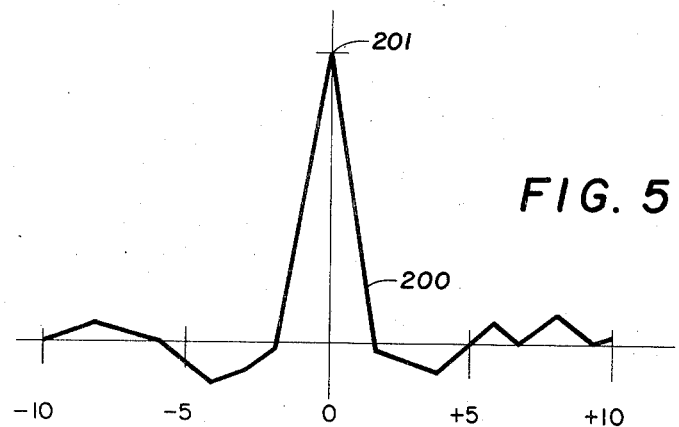
FIG. 5 illustrates the results of cross-correlation in accordance with the invention.

In FIG. 5, curve 200 illustrates the nature of the cross-correlated result from the signal of FIG. 2. As with any cross-correlation process, the principal maxima 201 occur only when the signal is aligned with the reference function. As might be expected, the output exhibits an approximate sin $x/x$ characteristic. It may be noted that this simple illustration is illustrative of cross-correlation of a signal against a fixed-reference function whose coefficients are always +1 or −1.

In the present invention, such a cross-correlation is employed. Further, the reference function preferably is optimized while maintaining minimum hardware requirements.

The foregoing illustrates real time cross-correlation of doppler radar returns with weighted correlation inputs. Simplified radar correlation is employed for treatment of doppler radar returns. In a typical operation, radar pulses are transmitted at 0.0005 second intervals. The returns between radar pulses are digitized at a rate of the order of 10 megacycles. Each return sample is placed in a multi-bit digital word register preferably of the order of at least 6 bits. Each return is thus converted into a digitized time series. Each member of the series is injected into two input bin on a first of the shift registers at a clock rate corresponding with the digital conversion version rate. Preferably a mask-register function is superimposed on the outputs of the shift registers for a simplified summation correlation. Preferably, the mask will change as a function of the scan angle and the speed in accordance with the change in doppler frequency $f_\omega = 2V/\lambda \cos \theta$, where $\lambda$ is the radar wavelength.

Although the invention has been described above in terms of the use of a series of shift registers, it will be appreciated that a drum memory, thin film memory or equivalent may be employed. In the present state of the art, the use of a shift register represents a preferred mode operation.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a high resolution airborne doppler radar having a bipolar video output channel for supplying a display unit, the combination which comprises:
   a. first converter means for digitizing the radar return signal at predetermined sample intervals following each radar pulse, b. a plurality of shift registers connected in tandem, each having range bins in number equal to the number of said intervals, c. means for connecting said first converter means to a first of said registers, d. clock means for stepping data words from said first converter means through said registers and for controlling said first converter means, e. summation units connected to the last range bin in all of said registers, f. means in said summation units for selecting last range bins of said registers in which negative data words are expected to produce a negative summation signal and for simultaneously selecting last range bins of said registers in which positive data words are expected to produce a positive summation signal, g. means to combine the absolute magnitudes of said positive and negative summation signals to produce a digitized correlation output signal, and h. a second converter means to translate said digitized correlation output signal to an analog signal for application to said display.

2. The combination of claim 1 wherein values of said expected positive and negative data words are selectively weighted in said summation units.

3. The combination set forth in claim 1 wherein the outputs from said last range bins are coupled in said summation units by weighting registers with means to limit the contribution to the output other than expected maximum values of said summation units by at least the most significant bit in the output of said first converter means.

4. The combination set forth in claim 1 wherein said returns are digitized in a code to give a dynamic range of the order of 32 db.

5. The combination according to claim 1 wherein the number of said shift registers connected in tandem corresponds with not less than about 10 percent of the beamwidth of data.

6. The combination according to claim 1 wherein the number of said shift registers connected in tandem corresponds with a full beamwidth of data.

7. The method of correlating airborne doppler radar returns which comprises:

a. digitizing the returns following each of a series of radar pulses, b. clocking the digitized samples of said returns through a plurality of shift registers, c. selectively summing the expected positive values appearing at the output stages of said registers to produce a positive summation, d. selectively summing the expected negative values appearing at the output stages of said registers to produce a negative summation, e. combining said positive summation and said negative summation to produce a digitized correlation output, and f. converting the digitized correlation output to an analog output for display.

8. The method of claim 7 wherein data from at least 10 percent of the radar beamwidth are in said shift registers at any one instant.

9. The method of claim 7 wherein values higher than expected low amplitude values of the doppler return signals appearing at the outputs of said shift registers are employed in the summations at reduced weights.

10. In a high resolution airborne doppler radar having a bipolar video output channel for supplying a display unit, the combination which comprises:

a. first converter means for digitizing the radar return signal at predetermined sample intervals following each radar pulse, b. a plurality of tap delay means having range bins between taps in number equal to the number of said intervals, c. means for connecting said first converter means to the input to said delay means, d. means for stepping data words from said first converter means past the taps on said delay means and for controlling said first converter means, e. summation units connected to said taps, f. means in said summation units for selecting taps from said delay means on which negative data words are expected to produce a negative summation signal and for simultaneously selecting taps on which positive data words are expected to produce a positive summation signal, g. means to combine the absolute magnitudes of said positive and negative summation signals to produce a digitized correlation output signal, and h. a second converter means to translate said digitized correlation output signal to an analog signal for application to said display.

11. The method of correlating airborne doppler radar returns which comprises:

a. digitizing the returns following each of a series of radar pulses, b. clocking the digitized samples of said returns through a multi-tapped delay means, c. selectively summing the expected positive values appearing at said taps to produce a positive summation, d. selectively summing the expected negative values appearing at said taps to produce a negative summation, e. combining said positive summation and said negative summation to produce a digitized correlation output, and f. converting the digitized correlation output to an analog output for display.

* * * * *